(No Model.)
W. C. PEIRCE.
PROCESS OF MAKING BEARING TUBES.
No. 541,053. Patented June 11, 1895.
Fig. 1. Fig. 2. Fig. 3. Fig. 4.
   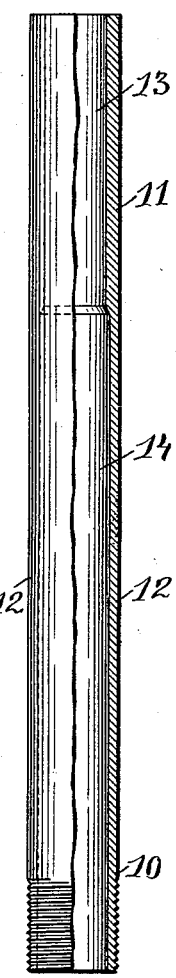
Fig. 5. Fig. 6. Fig. 7. Fig. 8.
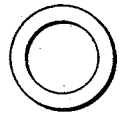 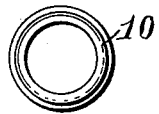 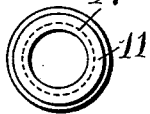 
WITNESSES:
Henry J. Miller
Chas. H. Luther Jr.
INVENTOR:
William C. Peirce,
by Joseph A. Miller & Co.,
Atty's.

UNITED STATES PATENT OFFICE.

WILLIAM C. PEIRCE, OF PROVIDENCE, RHODE ISLAND, ASSIGNOR TO THE PROVIDENCE MACHINE COMPANY, OF SAME PLACE.

PROCESS OF MAKING BEARING-TUBES.

SPECIFICATION forming part of Letters Patent No. 541,053, dated June 11, 1895.

Application filed January 2, 1894. Serial No. 495,381. (No model.)

*To all whom it may concern:*

Be it known that I, WILLIAM C. PEIRCE, of Providence, in the county of Providence and State of Rhode Island, have invented certain new and useful Improvements in the Process of Making Bearing-Tubes; and I hereby declare that the following is a full, clear, and exact description of the same, reference being had to the accompanying drawings, forming part of this specification.

This invention has reference to improvements in bearing-tubes, which are particularly adapted for use in roving-frames, and in the process for making the same.

The object of the invention is to reduce the cost of manufacture.

Another object is to increase the efficiency of the tube by increasing the wearing qualities of the bearing portion.

Another object of the invention is to construct a bearing-tube, from a tube having a parallel wall, having a bearing or journal portion and a clearance portion of larger internal diameter than the bearing portion without the necessity of drilling the clearance portion.

The invention consists in certain peculiar features in the process of construction whereby a new and improved bearing-tube is produced.

The invention also consists in the novel bearing-tube having an upper consolidated bearing portion and a lower clearance-chamber.

Figure 1 represents an elevation of the tube to be operated upon. Fig. 2 represents a similar view of the same tube after passing through the first step in the process when a screw-thread is to be cut thereon. Fig. 3 represents a similar view after the bearing portion has been contracted and the metal of that portion consolidated, Fig. 4 being a similar view of the completed tube. Fig. 5 is a plan view of Fig. 1; Fig. 6, an end view of the screw-threaded portion of the tube, Fig. 2; Fig. 7, a top view of the tube after the contraction of the bearing portion, and Fig. 8 a similar view of the completed tube.

Similar numbers of reference designate corresponding parts throughout.

Bearing-tubes of this description are generally used in roving-machines in which a large number of these tubes are mounted in bolsters which are in turn secured to and supported by bolster-rails. As heretofore constructed the bolsters have been provided with vertically disposed sleeves through which the lower ends of the tubes extended. The lower portions of the tubes contained within the sleeves were cut away to provide shoulders which, resting on the upper edges of the sleeves, would prevent the tubes from passing downward through the sleeves, the contracted portions of the tubes having screw-threads cut therein on which a securing-nut was screwed. The shoulders of the tubes bearing on the upper ends of the sleeves considerably weakened the tubes by the necessary cutting away and served as leverages which, when sudden lateral strain was exerted on the tubes, assisted rather than retarded the fracturing of the same.

Tubes of this description as heretofore constructed have been subjected to two drilling or boring processes, a tube with a thick wall being taken. It was first drilled from the bearing end for about one-third of its length. It was then reversed and drilled from the opposite end for the remaining two-thirds of its length with a drill of larger diameter than that at first used to provide a bore of larger diameter than the bearing to serve as a clearance space below the bearing. The cost of thus drilling the entire length of the tube is one of the largest items in its construction and the density of the metal of the bearing-portion remaining the same in the finished tube as in the blank necessitated the use of a heavy tube and bringing extra weight of metal on the bolster-rail.

In carrying my invention into practice I take a tube-blank similar to that shown in Fig. 1 of the drawings. This tube is constructed from ductile metal, generally steel of mild quality, or of aluminum or some alloy thereof, although any ductile material can be used. The lower end of the blank is now reduced in diameter as at 10 and a screw-thread is cut thereon. The upper end of the blank is then inserted in a machine adapted to reduce its diameter both at the exterior and interior and at the same time consolidating the metal and tempering the same by the rapidity of the blows thereon to form the bearing portion 11. In this step the bore of the bearing portion has been contracted to a diameter less than that of the proposed bearing. This portion of the tube is, therefore, next drilled out to the necessary size and the outer surface of the tube is finally cut away to a diameter equal to the reduced portion 10 producing a bearing-tube the outer surface 12 of which extends on a line from top to bottom, a thicker bearing portion 11 having a contracted bore 13 and a clearance-chamber 14 of a greater diameter than the bore of the bearing, thus saving the cost of drilling or boring the length of the clearance chamber while the strength of the tube is increased.

Having thus described my invention, I claim as new and desire to secure by Letters Patent—

The process of constructing bearing-tubes, as herein described, consisting in contracting the bore of a tube for a portion of its length by reducing its exterior diameter, next drilling, or finishing, the internal surface of the contracted portion, and finally cutting away the outer surface of the tube to a diameter less than that of the reduced portion.

In witness whereof I have hereunto set my hand.

WILLIAM C. PEIRCE.

Witnesses:
HENRY J. MILLER,
M. F. BLIGH.